US011399519B2

(12) United States Patent
Huang et al.

(10) Patent No.: US 11,399,519 B2
(45) Date of Patent: Aug. 2, 2022

(54) AQUAFARMING SYSTEM

(71) Applicant: Golden Algae Technology Ltd., Taichung (TW)

(72) Inventors: Ming-Luen Huang, Taipei (TW); Chiun-Teh Wu, Taichung (TW); Yung-Ho Chiu, Taichung (TW)

(73) Assignee: GOLDEN ALGAE TECHNOLOGY LTD., Taichung (TW)

( * ) Notice: Subject to any disclaimer, the term of this patent is extended or adjusted under 35 U.S.C. 154(b) by 156 days.

(21) Appl. No.: 16/907,371

(22) Filed: Jun. 22, 2020

(65) Prior Publication Data

US 2020/0396967 A1 Dec. 24, 2020

(30) Foreign Application Priority Data

Jun. 24, 2019 (TW) ................................ 108122023

(51) Int. Cl.
*A01K 61/50* (2017.01)

(52) U.S. Cl.
CPC .................................... *A01K 61/50* (2017.01)

(58) Field of Classification Search
USPC ................ 119/200, 236, 234, 239, 241, 240, 119/245–252, 267, 269, 244
See application file for complete search history.

(56) References Cited

U.S. PATENT DOCUMENTS

| | | | | | |
|---|---|---|---|---|---|
| 3,192,899 | A * | 7/1965 | Lucey | A01K 63/00 | 119/214 |
| 3,741,159 | A * | 6/1973 | Halaunbrenner | A01K 61/54 | 119/240 |
| 3,853,095 | A * | 12/1974 | Lawrence | A01K 61/54 | 119/238 |
| 3,870,019 | A * | 3/1975 | McNicol | A01K 61/54 | 119/241 |
| 3,889,639 | A * | 6/1975 | Day | A01K 61/59 | 119/211 |
| 3,916,833 | A * | 11/1975 | Serfling | A01K 61/59 | 119/210 |
| 4,007,709 | A * | 2/1977 | Wishner | A01K 61/59 | 119/210 |
| 4,036,176 | A * | 7/1977 | McCarty | A01K 61/00 | 119/207 |

(Continued)

FOREIGN PATENT DOCUMENTS

| | | | | |
|---|---|---|---|---|
| CN | 107428579 | * | 1/2012 | A01K 63/006 |
| CN | 204682167 U | | 10/2015 | |

(Continued)

*Primary Examiner* — Andrea M Valenti
(74) *Attorney, Agent, or Firm* — Ware, Fressola, Maguire & Barber LLP

(57) ABSTRACT

An aquafarming system is provided that includes a cultivating barrel with a multi-floor net assembly for the cultivation of shellfish creatures or the like. In the aquafarming system, the use of the multi-floor net assembly allows an increased cultivating area such that the quantity of the shellfish creatures being cultivated can be increased to thereby increase the productivity. At the harvest time, the multi-floor net assembly can be lifted up so as to be separated from the cultivating barrel such that the cultivated shellfish creatures can be easily and conveniently collected to reduced labor time and cost.

12 Claims, 10 Drawing Sheets

(56) References Cited

U.S. PATENT DOCUMENTS

| | | | | |
|---|---|---|---|---|
| 4,300,477 | A * | 11/1981 | Chapman | A01K 61/80 119/210 |
| 4,377,987 | A * | 3/1983 | Satre | A01K 61/54 119/241 |
| 4,744,331 | A * | 5/1988 | Whiffin | A01K 29/00 119/223 |
| 4,766,846 | A * | 8/1988 | Lavoie | A01K 61/54 119/240 |
| 5,515,813 | A * | 5/1996 | Wilkerson | A01K 61/54 119/223 |
| 5,653,193 | A * | 8/1997 | Marissal | A01K 61/54 119/240 |
| 7,870,836 | B2 * | 1/2011 | Froyland | A01K 61/59 119/209 |
| 9,167,803 | B2 * | 10/2015 | Fujiyoshi | A01K 61/54 |
| 2002/0129772 | A1 * | 9/2002 | Gagnon | A01K 61/54 119/237 |
| 2011/0017144 | A1 * | 1/2011 | Calinski | A01K 61/70 119/200 |
| 2012/0167829 | A1 * | 7/2012 | Madsen | A01K 61/10 119/223 |
| 2015/0150223 | A1 * | 6/2015 | Robinson | A01K 61/60 119/223 |

FOREIGN PATENT DOCUMENTS

| | | | | |
|---|---|---|---|---|
| CN | 205511629 | U | 8/2016 | |
| KR | 20130036519 | A * | 4/2013 | A01K 61/17 |
| TW | I568349 | B | 2/2017 | |

* cited by examiner

AQUAFARMING SYSTEM

CROSS-REFERENCE TO RELATED APPLICATIONS

This application claims priority under 35 U.S.C. § 119 to Taiwan Patent Application No. 108122023 filed on Jun. 24, 2019, which is hereby incorporated by reference in its entirety.

BACKGROUND OF THE INVENTION

1. Field of the Invention

The invention relates to aquafarming technology, and more particularly to an aquafarming system with a multi-floor net assembly for cultivating shellfish creatures.

2. Description of Related Art

The cultivation of shellfish creatures, such as clams, oysters, scallops, abalones, mussels, razor clams, mud cockles, or the like, is traditionally conducted at a sea water site near the shore. However, since the sea water is open to the surrounding environment, the water flow and recycling in the seawater-based cultivating area are hard to control. As a consequence, the traditional way of cultivating shellfish creatures in a seawater site has the following drawbacks. First, it would be difficult to inhibit the growth of bacteria within the seawater-based cultivating area; and second, it would be difficult to adequately control the following conditions: the seawater temperature, the amount of exposure to sunlight, and the change in the salinity of the seawater due to rain. These conditions could adversely harm the growth of the shellfish creatures being cultivated, thus resulting in an unstably low survival rate, which has been a long-standing problem in the cultivation of shellfish creatures in the seawater.

Moreover, in the case of cultivating shellfish creatures in the seawater, natural diatoms are used as the main food (nutrients) for feeding the shellfish creatures being cultivated. The supply of diatoms in the seawater, however, would be adversely affected by changes in the natural environment and weather conditions. In the event that the supply of diatoms is low and insufficient, it would severely harm the growth of the shellfish creatures being cultivated.

In addition, with land originated pollutants that gradually contaminate the oceanic ecological environment near the seashore, the survival rate of the shellfish creatures being cultivated in the seawater is severely affected. In the worst case, the pollution could even cause the shellfish creatures being cultivated in the seawater to suffer from mass death, thus severely affect the harvest rate.

In view of the above-mentioned problems, it is apparent that the presently used outdoor seawater-based cultivating method is unsuitable and inadequate for use to cultivate shellfish creatures. In the worst case, these problems could cause the shellfish creatures being cultivated to suffer from mass death due to such factors as insufficient supply of food and nutrients, adverse changes in the surrounding environments, and/or infection of disease-causing bacteria in the seawater. As a consequence, the shellfish creatures being cultivated have a low survival rate which undesirably corresponds to a low harvest rate.

One solution to the foregoing problems is to use an aquafarming box that can be installed at an indoor site. However, since the cultivation of shellfish creatures requires the use of high-purity salty water, one drawback to the presently-used aquafarming box is that the purity of the water filled therein could be contaminated by the remnants of the food and nutrients used to feed the shellfish creatures as well as by the excrements of the shellfish creatures. Meanwhile, since the growth of shellfish creatures could be easily affected by the temperature and salinity of the salty water filled in the aquafarming box, it requires the supervising personnel to change the water in the aquafarming box frequently on a regular basis, which is not only very laborious but also very time-consuming. Moreover, the presently-used aquafarming box is quite difficult to handle and operate by hand such that at the harvest time, it would be inconvenient for the harvest personnel to collect the cultivated shellfish creatures in an easy and convenient manner. Therefore, there exists a need in the cultivation of shellfish creatures for an improvement to the presently-used aquafarming box.

In view of the above-mentioned problems, the inventor of this application has meticulously conducted a research efforts based on long research and development experiences, which results in the creation and design of a novel aquafarming system that represents a feasible solution to the above-mentioned problems.

SUMMARY OF THE INVENTION

It is therefore an objective of this invention to provide an aquafarming system which can be used for the cultivation of shellfish creatures at an indoor site instead of a seawater site near seashore.

It is another objective of this invention to provide an aquafarming system which can increase the survival rate and thus the harvest rate of the shellfish creatures being cultivated. It is still another objective of this invention to provide an aquafarming system which can provide a daylight-like environment for the cultivation of shellfish creatures.

It is yet another objective of this invention to provide an aquafarming system which includes a nutrient-distribution mechanism that allows nutrients to be evenly distributed to all the shellfish creatures being cultivated.

It is yet another objective of this invention to provide an aquafarming system which allows the harvest personnel to easily and conveniently collect the cultivated shellfish creatures at the harvest time.

To achieve the foregoing objectives, the invention proposes an aquafarming system which includes a cultivating barrel with a multi-floor net assembly for the cultivation of shellfish creatures or the like. In the aquafarming system, the use of the multi-floor net assembly allows an increased cultivating area such that the quantity of the shellfish creatures being cultivated can be increased to thereby increase the productivity. At the harvest time, the multi-floor net assembly can be lifted up so as to be separated from the cultivating barrel such that the cultivated shellfish creatures can be easily and conveniently collected to reduced labor time and cost.

BRIEF DESCRIPTION OF DRAWINGS

The invention can be more fully understood by reading the following detailed description of the preferred embodiments, with reference made to the accompanying drawings, wherein.

DETAILED DESCRIPTION OF THE INVENTION

Figure 1:
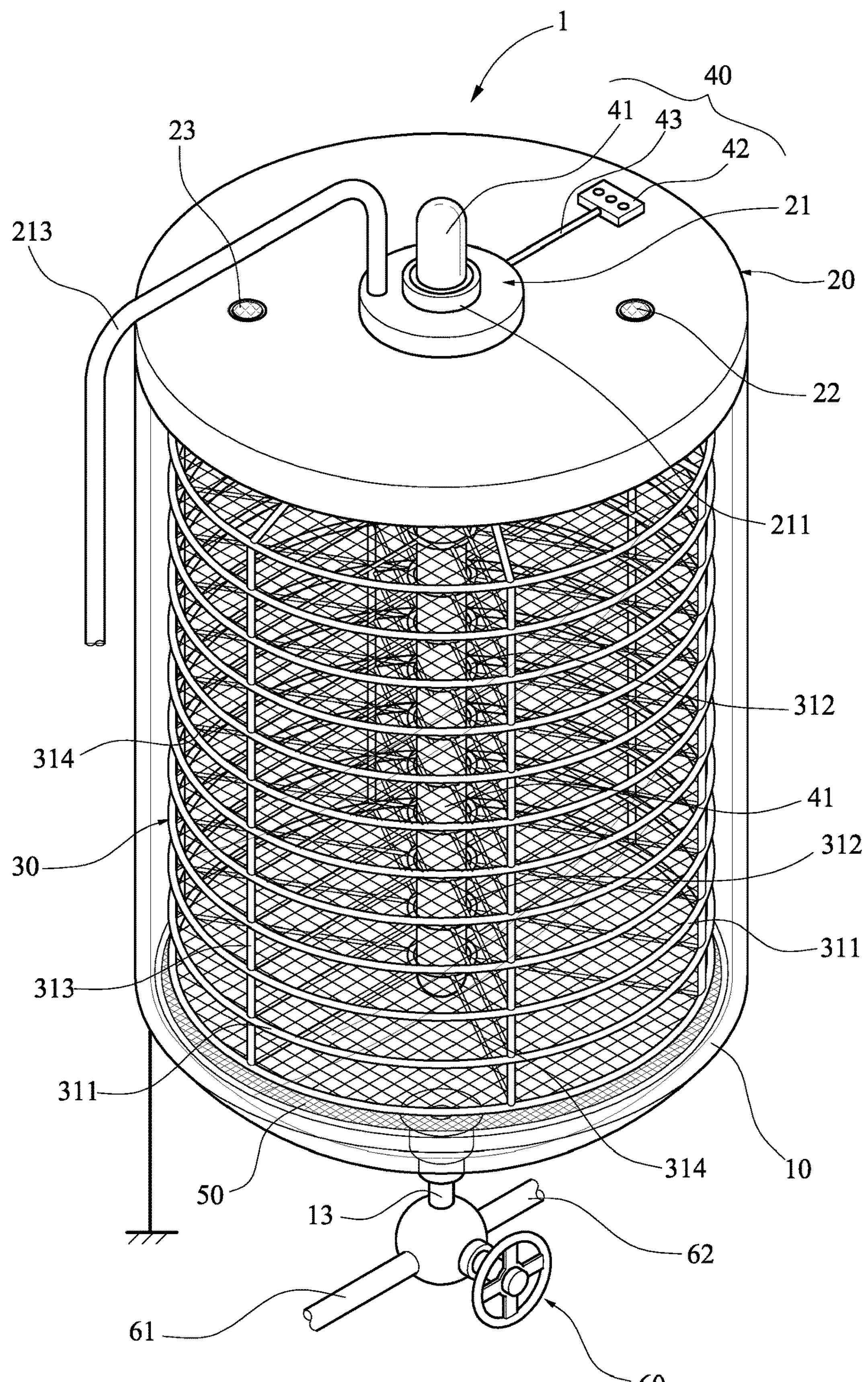
FIG. 1 is a schematic diagram showing a perspective view of the aquafarming system of the invention.
Figure 2:
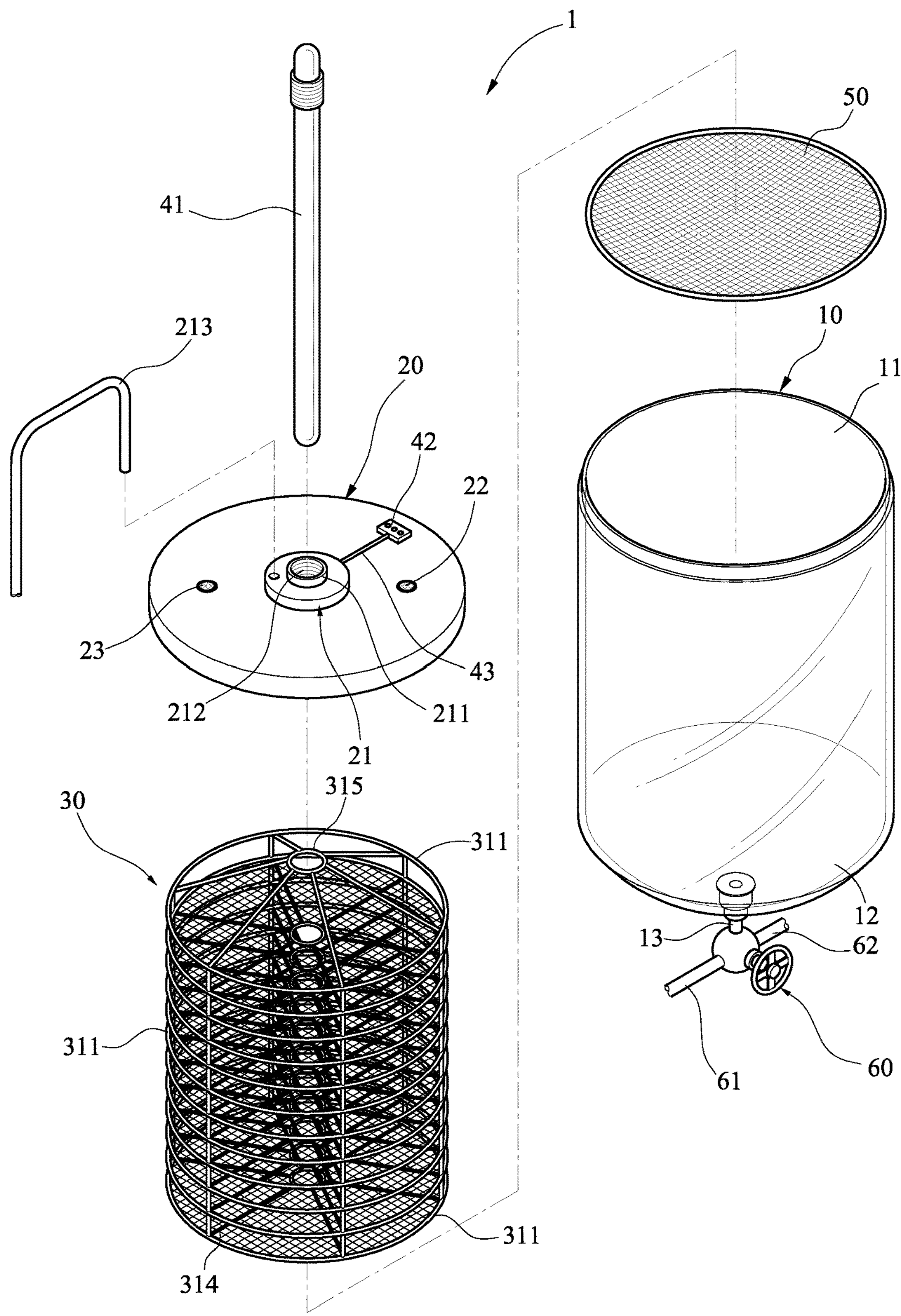
FIG. 2 is a schematic diagram showing an exploded perspective view of the aquafarming system of the invention.

Referring to FIGS. 1-4, the aquafarming system 1 according to the invention comprises a cultivating barrel 10, an upper cover 20, a netted cage 30, and a lighting module 40.

The cultivating barrel 10 is preferably made of stainless steel or reinforced plastic material having an opening 11 on the top side. The bottom side 12 is circularly shaped for mounting a circular filtering net 50 which is used for filtering out waste substances in the water filled in the cultivating barrel 10. The cultivating barrel 10 is filled with a volume of nutrient-containing water 70, and is provided with a water outlet 13 in the center of the bottom side 12. The water outlet 13 is fitted with a valve switch 60 for selectively controlling the flowing of the nutrient-containing water 70 to either a recycling tube 61 or a drainage tube 62.

The upper cover 20 is provided in the center with a protruded flange 21 for securely mounting a light-emitting unit, such as an elongated light emitting diode (LED) unit 41. The upper cover 20 is formed with an air inlet 22 and an air outlet 23, wherein the air inlet 22 is used for introducing oxygen into the cultivating barrel 10, whereas the air outlet 23 is used for draining out carbon dioxide. On the upper cover 20, the lighting module 40 includes an illumination-control unit 42 which is connected to the LED unit 41, and which is equipped with special circuitry and software that can regulate the LED unit 41 to emit light with an optimized spectrum and intensity in order to provide an optimized daylight-like environment for the growth of the shellfish creatures 80 being cultivated. The protruded flange 21 is formed with a central protruded portion 211 with a threaded inner sidewall 212. The LED unit 41 is securely mounted on the central protruded portion 211. The protruded flange 21 is provided with an injection tube 213 for injecting a stream of nutrient-containing water 70 from the top into the cultivating barrel 10. The supply of the nutrient-containing water 70 can be 2.5 to 12 times greater than that normally used in outdoor seawater-based farming site so as to allow the shellfish creatures 80 being cultivated to grow more quickly to a larger size and weight with a shorter cultivating period.

Figure 3:
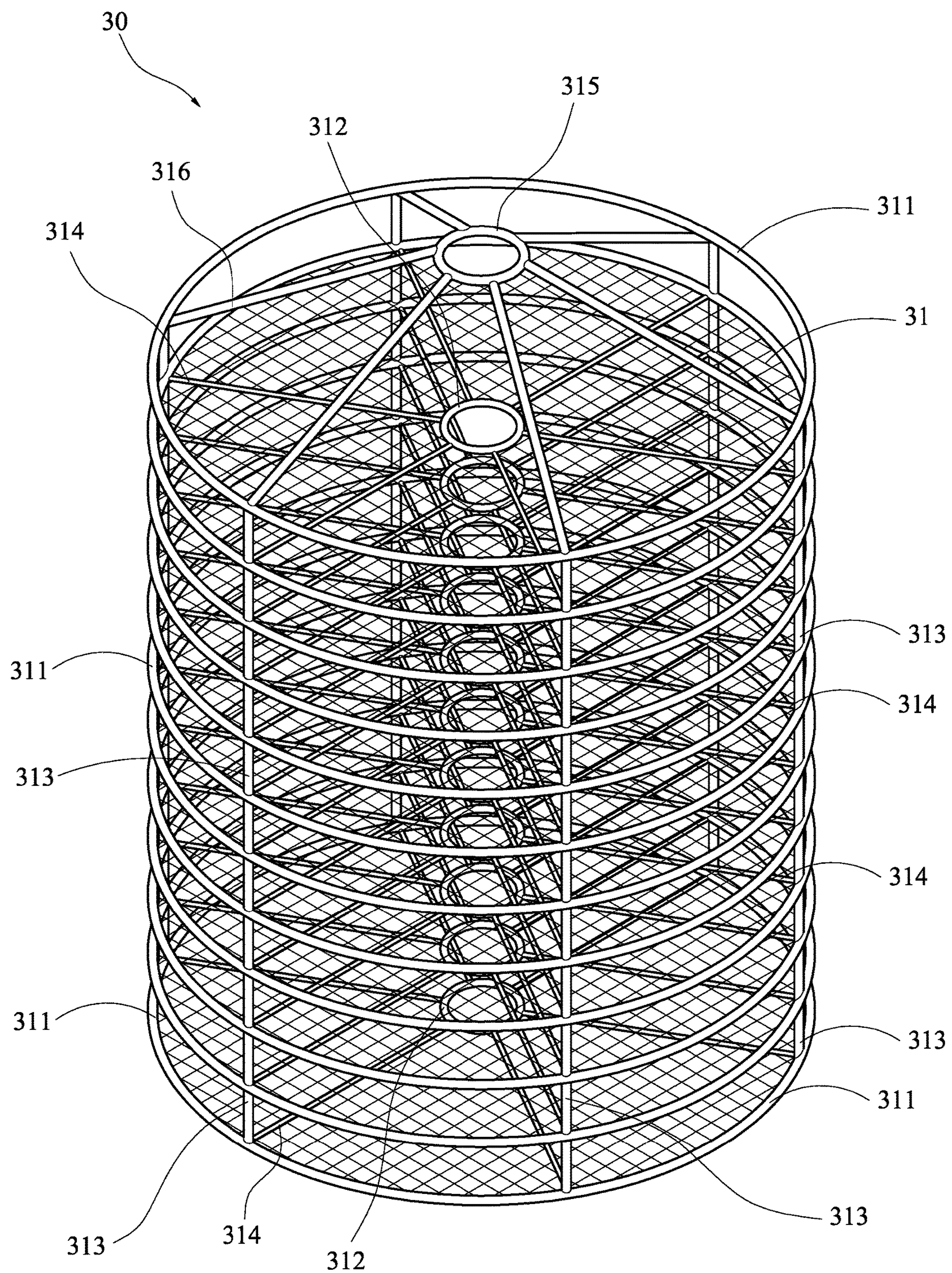
FIG. 3 is a schematic diagram showing an enlarged perspective view of a netted cage in the aquafarming system of the invention.
Figure 4:
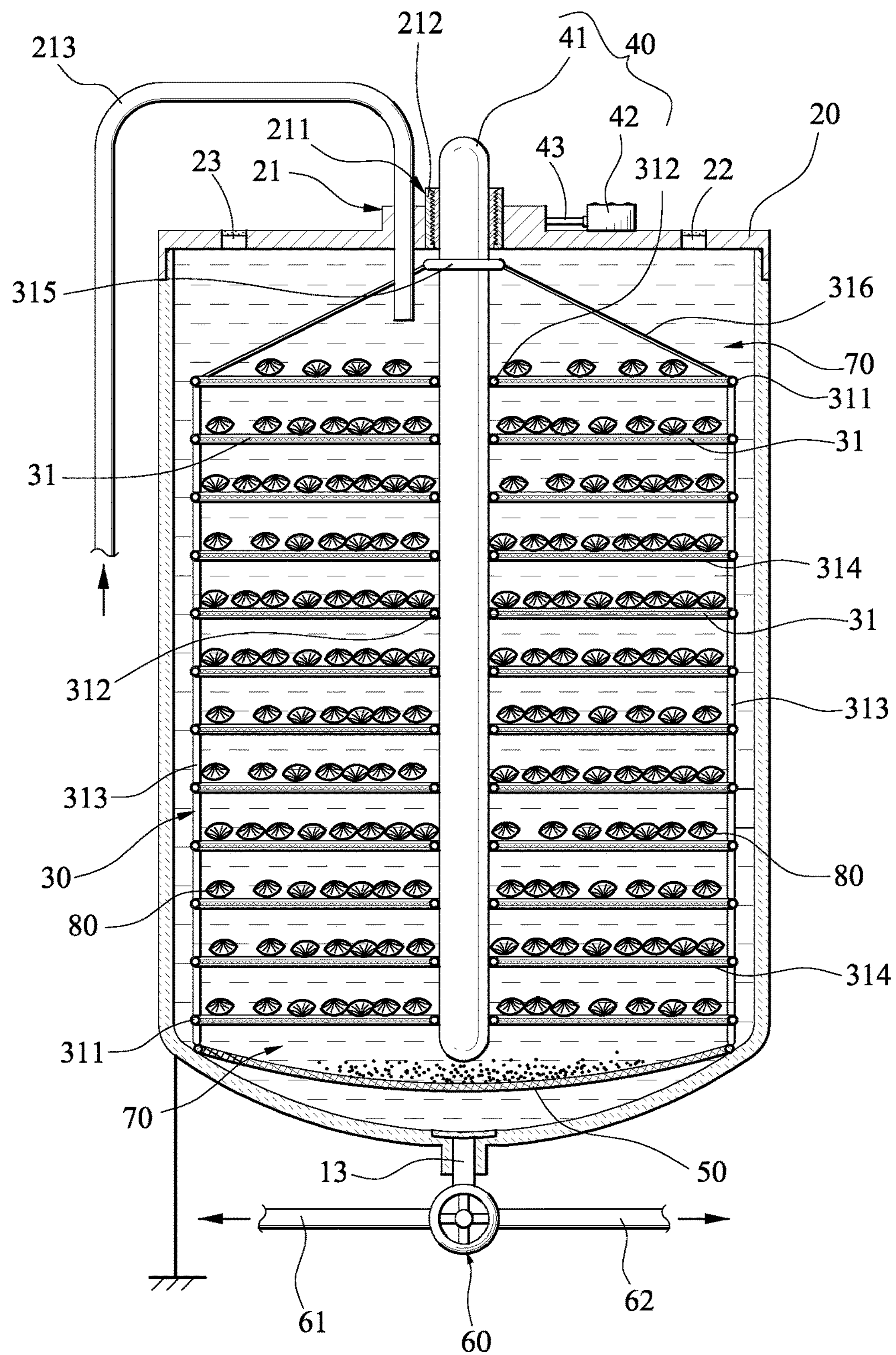
FIG. 4 is a schematic diagram showing a longitudinal sectional view of the aquafarming system of the invention.

Referring together to FIG. 3, the netted cage 30 is provided with a multi-floor net assembly 31, with each floor being provided with an outer support ring 311 and an inner support ring 312 on the inner side of the outer support ring 311. Each inner support ring 312 has a centrally-hollowed structure which is used for mounting the elongated LED unit 41 in the center of the cultivating barrel 10. The multi-floor net assembly 31 can be formed by interweaving a plurality of nylon cords, reinforced plastic cords, or stainless steel cords.

Each outer support ring 311 is securely fixed to a plurality of vertical support bars 313 for secured support. Between the outer support ring 311 and the inner support ring 312 on the bottom side of the multi-floor net assembly 31, there is provided with a plurality of horizontal support bars 314 for reinforcing the bottom side of the multi-floor net assembly 31 to thereby provide a secured and reinforced support to the overall structure.

The top end of each vertical support bar 313 of the multi-floor net assembly 31 is linked to a suspension support bar 316 which is linked upward to a suspension ring 315. The suspension support bar 316 can be used to lift up the netted cage 30 so as to be separated from the cultivating barrel 10 at the harvest time, thus allowing the harvest personnel to easily and conveniently collect the cultivated shellfish creatures 80 from the netted cage 30. The suspension ring 315 and the inner support ring 312 are both centrally-hollowed so that the LED unit 41 can be mounted therein.

In actual use, the shellfish creatures 80 being cultivated are placed on each floor of the multi-floor net assembly 31. In order to firmly secure the overall structure, each inner support ring 312 can be linked to a plurality of vertical support bar (not shown).

The lighting module 40 includes an LED unit 41 and an illumination-control unit 42, wherein the LED unit 41 is elongated and installed in a longitudinal manner along the central axis of the netted cage 30 to serve as an artificial light source under control by the illumination-control unit 42. The LED unit 41 can be controlled by the illumination-control unit 42 to emit light for a time period of from 12 to 16 hours per day, such that the amount of the exposure to light received by the shellfish creatures 80 being cultivated is 2 to 3 times longer than the daylight received at an outdoor seawater-based farming site. Moreover, the LED unit 41 can be controlled to emit light with a specified spectrum that is suited to the particular species of the shellfish creatures 80 being cultivated. In addition, the LED unit 41 can also be used to adjust the temperature of the water filled in the cultivating barrel 10 by emitting light with various intensities. The LED unit 41 is configured to emit light evenly in all directions such that the inside space within the netted cage 30 can be evenly illuminated to provide an optimal daylight-like environment for the growth of the shellfish creatures 80. This feature allows the growth of the shellfish creatures 80 to be homogenous and speedy with a higher survival rate.

The illumination-control unit 42 is connected via a cable 43 to the protruded flange 21 where the LED unit 41 is mounted for controlling the on/off state of the LED unit 41 in such a manner that allows the LED unit 41 to emit light only during a specified time period, and also controlling the LED unit 41 to emit light with a specified spectrum that is suited to the particular species of the shellfish creatures 80 being cultivated such that it can help facilitate and speed up the growth of the shellfish creatures 80 being cultivated. The illumination-control unit 42 includes specialized circuitry and software that can control the LED unit 41 to emit light with the most suited spectrum and intensity to thereby provide an optimal daylight-like environment for the growth of the shellfish creatures 80 being cultivated.

The filtering net 50 is used for filtering out excessive remnants of the food and nutrients that are unconsumed by the shellfish creatures 80 as well as the excrements of the shellfish creatures 80 that are mixed in the water. This allows the nutrient-containing water 70 to be recycled for reuse.

When the nutrient-containing water 70 needs to be recycled, the valve switch 60 can be turned to connect the water outlet 13 to the recycling tube 61, thereby allowing the nutrient-containing water 70 to flow to the recycling tube 61 to be sent to a purifying apparatus (not shown) where the drained nutrient-containing water 70 undergoes a purification and sterilization process and a salinity-adjusting process. The recycled nutrient-containing water 70 is then injected via the injection tube 213 back into the cultivating barrel 10 for reuse. The design of this recycling mechanism allows 95% of the nutrient-containing water 70 to be recycled for reuse and thus can help save the water resource. When the nutrient-containing water 70 filled in the cultivating barrel 10 is contaminated with excessive remnants of nutrients and excrements of the shellfish creatures 80, the valve switch 60 can be turned to the other direction for connecting the water outlet 13 to a drainage tube 62, thereby allowing the contaminated water to be drained out via the drainage tube 62.

At the harvest time, the invention allows the harvest personnel to use a lifting hook (not shown) to hook to the suspension ring 315 such that the netted cage 30 can be lifted up and thereby separated from the cultivating barrel 10, thus allowing the cultivated shellfish creatures 80 placed in the multi-floor net assembly 31 to be easily and conveniently collected by the harvest personnel. After the harvest is completed, the netted cage 30 can be reinstalled back into the cultivating barrel 10 and then a new volume of nutrient-containing water 70 can be refilled into the cultivating barrel 10 so that the aquafarming system 1 can be used to cultivate another batch of shellfish creatures. This harvest method can help reduce the labor time and cost by approximately 70%.

Figure 5:
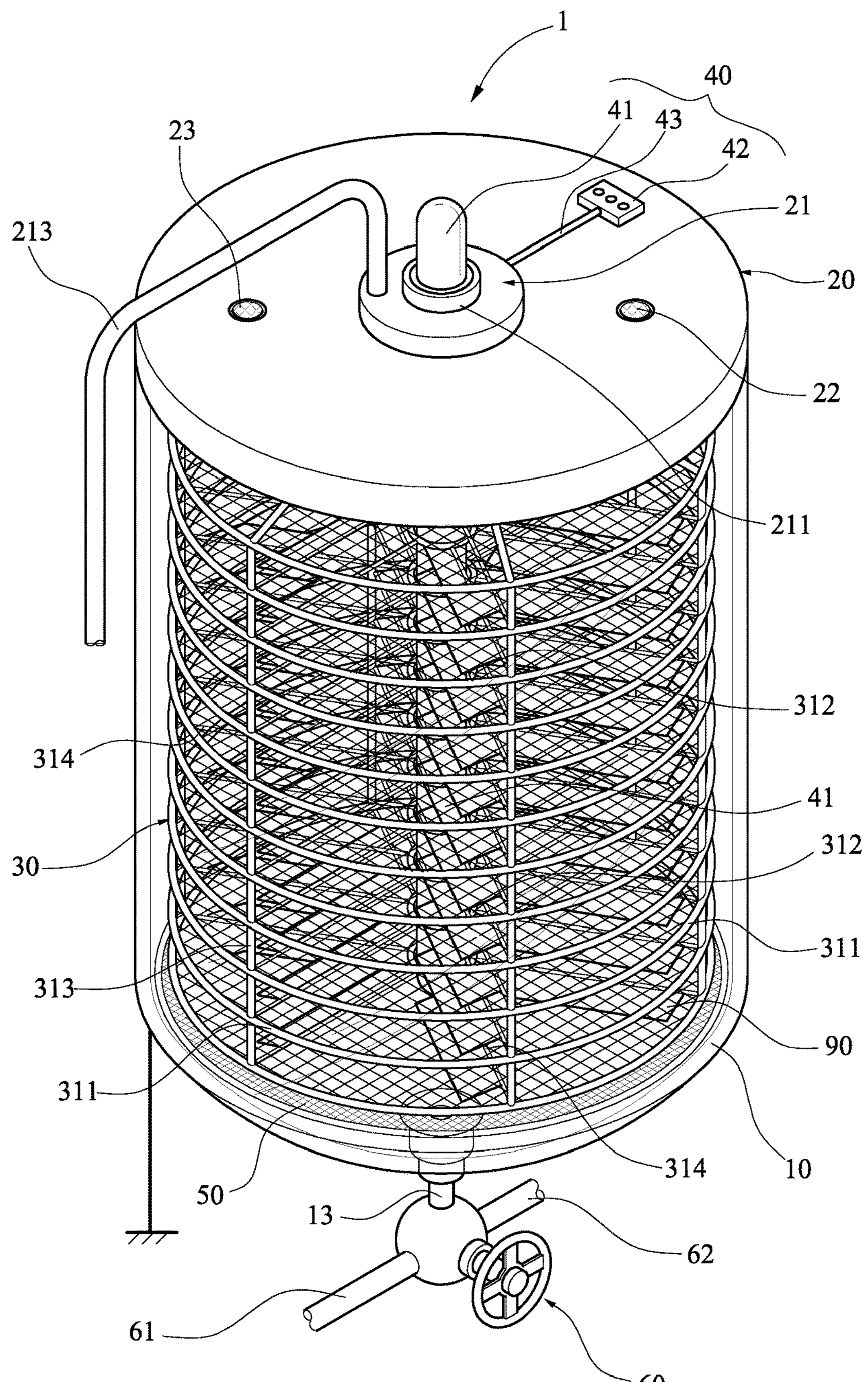
FIG. 5 is a schematic diagram showing a perspective view of the aquafarming system of the invention with the installation of an assembly of deflectors and spoiler flaps.
Figure 6:
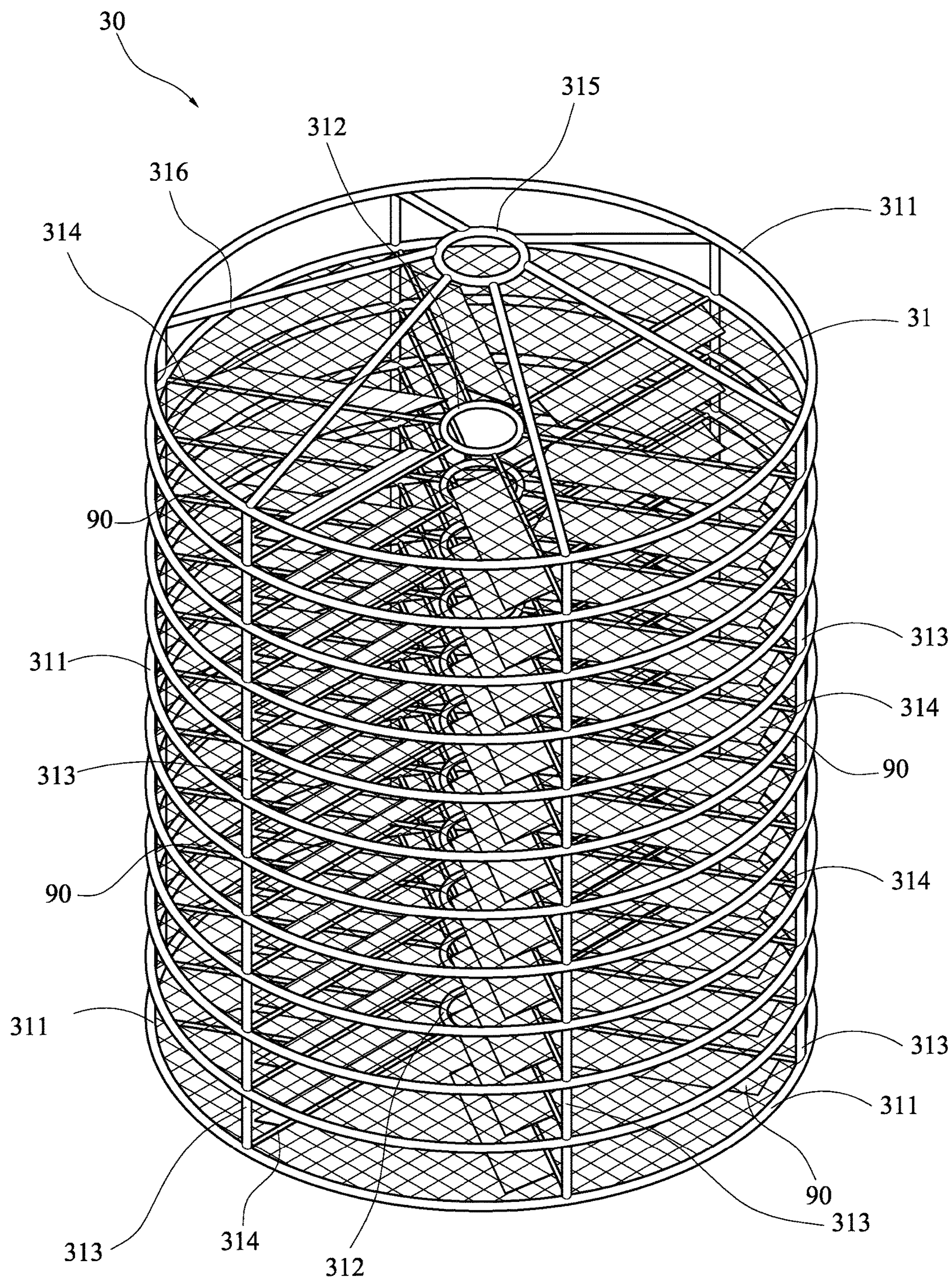
FIG. 6 is a schematic diagram showing an enlarged perspective view of the netted cage in the aquafarming system of the invention with the installation of an assembly of deflectors and spoiler flaps.
Figure 7:
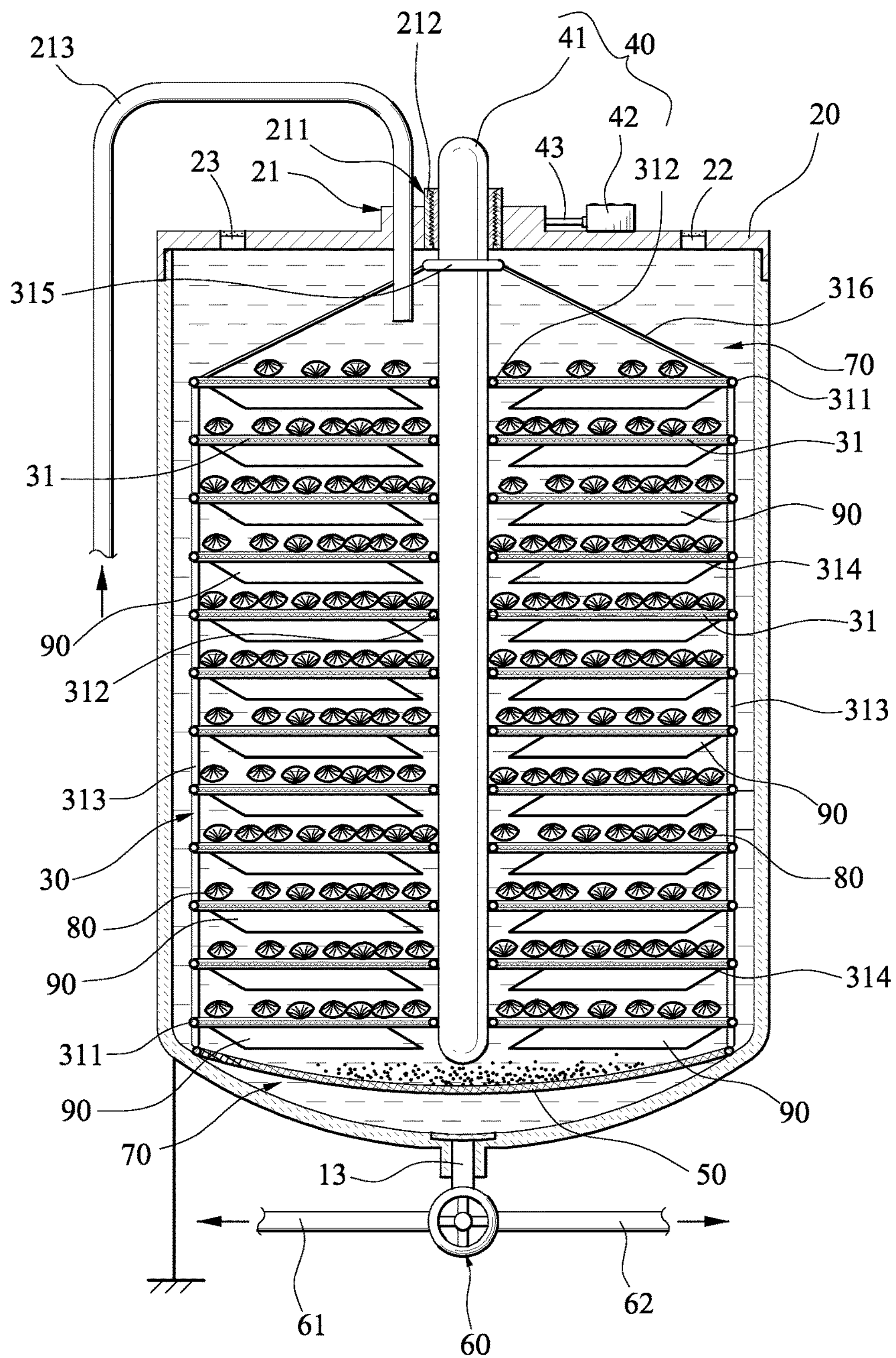
FIG. 7 is a schematic diagram showing a longitudinal sectional view of the aquafarming system of the invention with the installation of an assembly of deflectors and spoiler flaps.

Referring to FIGS. 5 to 7, a nutrient-distributing mechanism is provided which includes a deflecting plate 90 secured to the horizontal support bar 314 at each floor of the multi-floor net assembly 31 of the netted cage 30. The deflecting plate 90 is configured in a downward-sloped manner and can be either a fixed type or a movable type to provide a deflecting effect that allows the downward flowing of the nutrient-containing water 70 after being injected into the cultivating barrel 10 to be deflected and flow to each floor of the multi-floor net assembly 31. This deflected flow causes the nutrient substances contained in the nutrient-containing water 70 to be distributed to each floor of the multi-floor net assembly 31 where a subgroup of shellfish creatures 80 are placed for cultivation. This allows the nutrient substances in the nutrient-containing water 70 to be received and eaten by all the shellfish creatures 80 placed in each floor of the multi-floor net assembly 31 to facilitate their growth.

If the deflecting plate 90 is a fixed type, it is preferably sloped with respect to the horizontal plane by an angle within the range from 10 to 45 degrees, and most preferably 15 degrees. On the other hand, if the deflecting plate 90 is a movable type, it can be pushed by the downward flowing of the nutrient-containing water 70 to thereby produce an up-and-down swinging movement. The angular range of the swinging movement can be restricted by using stoppers (not shown) placed on both sides of the deflecting plate 90 so that the swinging movement can be restricted within the angular range from 10 to 45 degrees.

In either case of a fixed type or a movable type, the deflecting plate 90 can be further provided with at least one spoiler flap 91 which is configured to have a prespecified intersection angle with respect to the deflecting plate 90. If the deflecting plate 90 is a fixed type, the sloped angle of the deflecting plate 90 is preferable 30 degrees, while the intersection angle between the spoiler flap 91 and the deflecting plate 90 is preferably within the range from 10 to 15 degrees, and most preferably 15 degrees.

Figure 8:
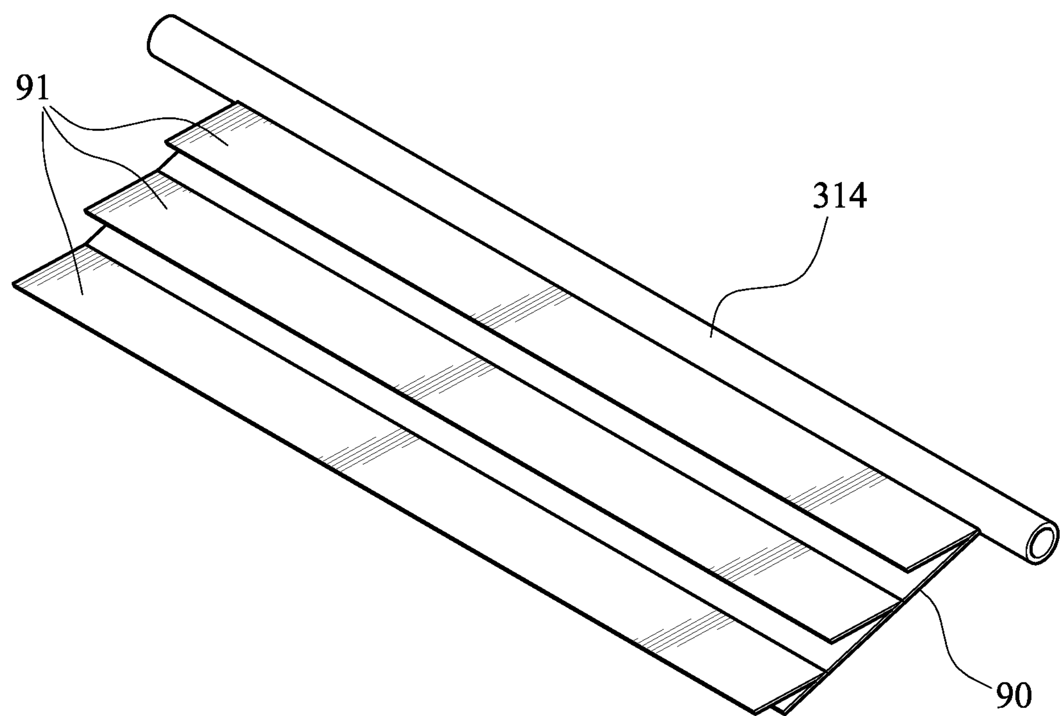
FIG. 8 is a schematic diagram showing a perspective view of a deflector with three spoiler flaps used in the aquafarming system of the invention.
Figure 9:
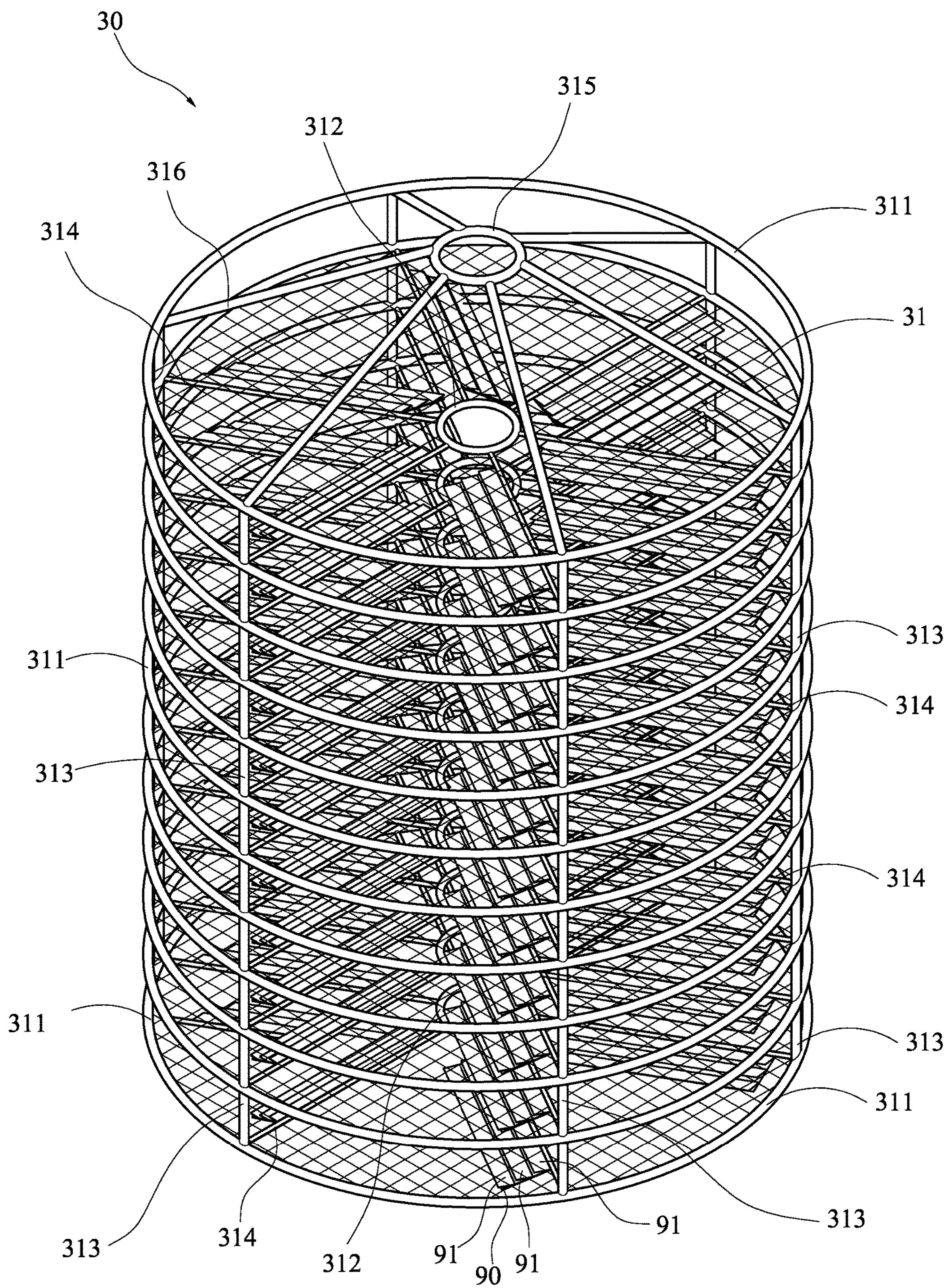
FIG. 9 is a schematic diagram showing a perspective view of an assembly of deflectors and spoiler flaps installed in the aquafarming system of the invention.
Figure 10:
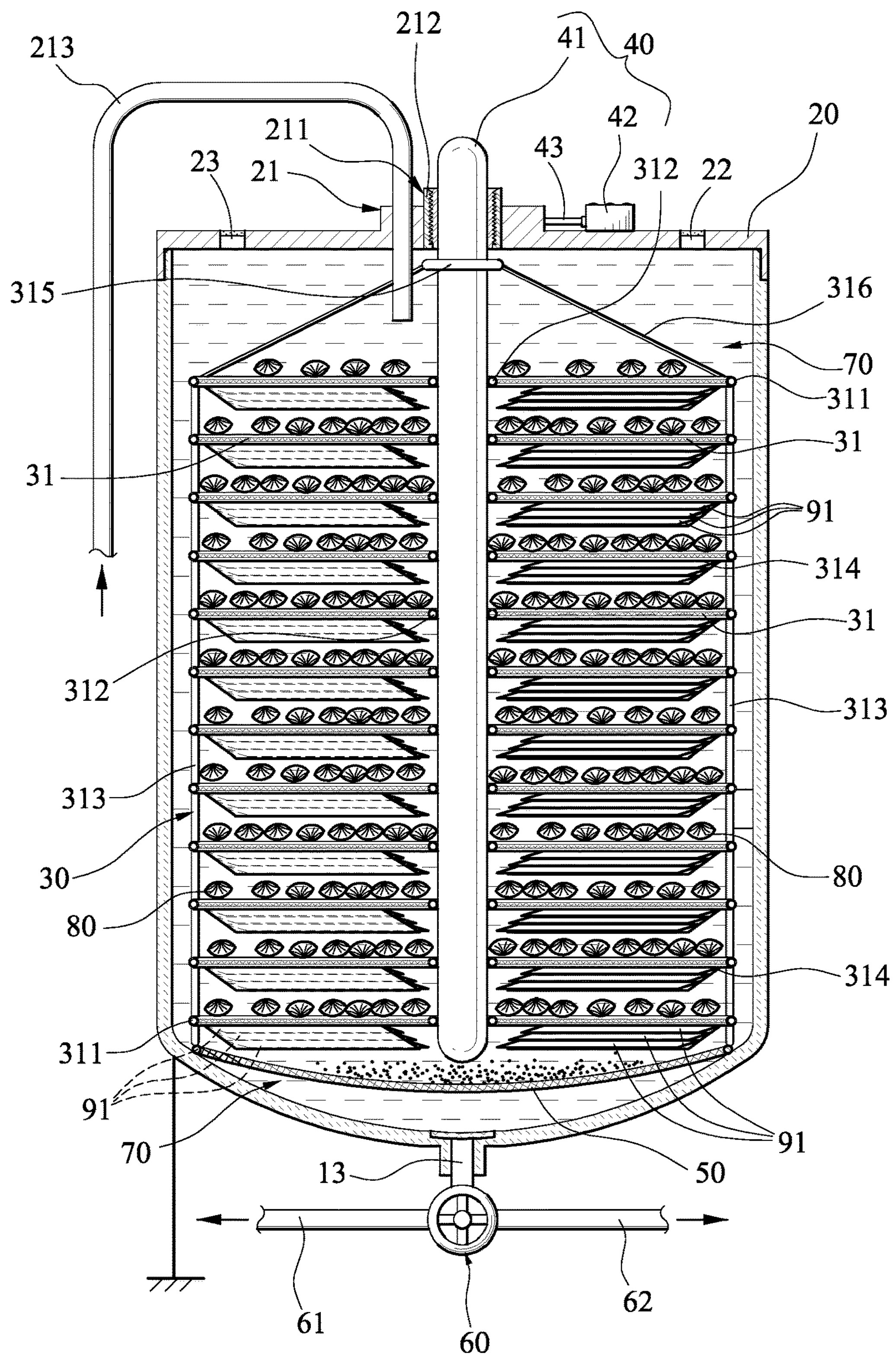
FIG. 10 is a schematic diagram showing a longitudinal sectional view of an assembly of deflectors and spoiler flaps installed in the aquafarming system of the invention.

Referring also to FIG. 8, in this embodiment of the invention, the deflecting plate 90 is provided with three spoiler flaps 91. When a volume of nutrient-containing water 70 is being injected from the top into the cultivating barrel 10, the downward flowing of the injected nutrient-containing water 70, when bumping into the spoiler flaps 91, will cause the so-called spoiling effect in fluid dynamics, such that the downward flowing of the nutrient-containing water 70 will be hampered and thus slowed down. The slowing down of the injected nutrient-containing water 70 thus allows the nutrient substances in the nutrient-containing water 70 to flow slowly and stays longer over each floor of the multi-floor net assembly 31 such that the shellfish creatures 80 placed on each floor can easily receive and eat the nutrient substances in the nutrient-containing water 70. This feature can therefore facilitate and speed up the growth of the shellfish creatures 80 being cultivated. Preferably, the spoiler flaps 91 are made of soft material that allow the spoiler flaps 91 to swing easily against the downward flowing of the nutrient-containing water 70.

Furthermore, the invention is capable of simulating the natural flow of sea water for the nutrient-containing water 70 filled in the cultivating barrel 10 by generating a swirl of bubbles inside the cultivating barrel 10 so as to facilitate the growth of the shellfish creatures 80 being cultivated.

Moreover, in accordance with the invention, the multi-floor net assembly 31 can be instead made by using a thin stainless steel plate or a rust-resistant metal plate which is drilled to form a multiplicity of holes that can equivalently provide a net-like effect.

In the above embodiments, the aquafarming system 1 is used for the cultivation of oceanic shellfish creatures, but it is to be understood that the invention can be broadly used for the cultivation of other kinds of aquatic creatures such as freshwater clams, freshwater mussels, mud snails, or freshwater shrimps, to name just a few.

In accordance with the invention, the netted cage 30 can be either a one-piece type or a combination type which is a combination of various parts that can be combined to serve the same purpose.

Moreover, in accordance with the invention, the LED unit 41 can be instead replaced by using a fluorescent lamp or an incandescent lamp that can emit light to provide the same illuminating effect as LED.

In the embodiments described above, the cultivating barrel 10, the upper cover 20, and the netted cage 30 are all circularly-shaped. However, it is to be understood that they can also be formed with any shape, such as a square shape, a rectangular shape, a polygonal shape, an elliptical shape, a plum flower shape, and so one, to serve the same purpose.

The invention is capable of controlling the cultivating environment and the feeding of food and nutrients to optimal conditions such that it can be anticipated that if the invention is used to cultivate pearl mussels, the pearls produced by the mussels would have high quality and a high CP (cost-to-performance) value.

As a summary, it can be concluded from the above description that with the provision of the above-described features, the invention has the following advantages:

(1) First, the invention is capable of controlling the cultivating environment to facilitate the growth of the shellfish creatures being cultivated, such as by using an LED lighting module which is controlled in such a manner as to increase the time duration of exposure to light, emit light with a specified spectrum that is suited to the growth of the particular species of the shellfish creatures being cultivated, and adjust the water temperature to an optimal level. Moreover, the LED unit is capable of spreading the emitted light evenly to all directions in the cultivating barrel so that the illumination at every point inside the cultivating barrel is even. This feature provides an optimal cultivating environment that allows the growth of the shellfish creatures to be homogenous and speedy so that they can grow more quickly to a larger size and weight with a shorter cultivating period and an increased survival rate.

(2) Second, the invention can help save space and increase productivity by providing a multi-floor net assembly that includes multiple floors to increase the overall quantity of shellfish creatures being cultivated. Moreover, the invention can be arranged with multiple units into a row or a two-dimensional array so that the productivity can be multiplied.

(3) Third, the invention is capable of providing a flow of convection to the nutrient-containing water injected into the cultivating barrel so that the injected nutrient-containing water can be deflected to flow to each floor of the multi-floor net assembly, such that the nutrient substances contained in the nutrient-containing water can be distributed evenly to each floor to be received and eaten by the shellfish creatures being cultivated. This feature can therefore help facilitate and speed up the growth of the shellfish creatures being cultivated.

(4) Fourth, the invention is capable of providing a Kaman vortex street effect to the downward flowing of the nutrient-containing water while injected from the top side into the cultivating barrel, whereby the flow of the nutrient substances contained in the nutrient-containing water can be hampered and thus slowed down when reaching each floor of the multi-floor net assembly. This allows the nutrient substances to be easily received and eaten by the shellfish creatures being cultivated, thus facilitating and speeding up the growth of the shellfish creatures being cultivated. This effect is designed in accordance with the theory of Kaman vortex street (or called von Kaman vortex street).

(5) Fifth, at the harvest time, the invention allows the netted cage to be separated from the cultivating barrel, thereby allowing the harvest personnel to easily and conveniently collect the cultivated shellfish creatures from the netted cage. This feature allows the harvest work to be significantly reduced in labor time and cost.

(6) Sixth, the invention can prevent pollution and contamination to the water filled in the cultivating barrel by regularly filtered, regularly recycling and purifying the water.

(7) Seventh, the invention is simple in construction such that it is easy to manufacture and assemble with a low cost and is also easy to use and operate.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An aquafarming system, being adopted for application in indoor aquafarming, and comprising:

a cultivating barrel having a top opening;

an upper cover for shielding the top opening so as to form a closed aquafarming space in the cultivating barrel, wherein there is a water inlet port and an install hole provided on the upper cover, such that a nutrient-containing water is filled into the closed aquafarming space through the water inlet port, thereby being confined in the closed aquafarming space by the cultivating barrel and the upper cover;

M number of supporting units, wherein each said supporting unit comprises: a circular support bar, a center circular support bar disposed at a center of the circular support bar, and N number of first ribs connected between the center circular support bar and the circular support bar; wherein M and N are both an integer;

M number of floor net members, being disposed on the M number of supporting units, respectively;

N number of vertical support bars, wherein each of said vertical support bars is serially connected the M number of circular support bars, so as to make any two said circular support bars have a disposing spacing;

a circular connecting bar, being connected to the N number of vertical support bars, so as to be disposed over the M number of supporting units;

a suspension ring, being relatively disposed at a center of the circular connecting bar, wherein there are N number of second ribs connected between the suspension ring and the circular connecting bar, such that the suspension ring, the circular connecting bar, the M number of supporting units, the M number of floor net members, and the N number of vertical support bars constitute a netted cage, and the netted cage is disposed in the closed aquafarming space;

at least one deflecting plate, being disposed in the closed aquafarming space, and having at least one spoiler flap for providing a Karman vortex street effect to a downward flowing stream of the nutrient-containing water when being injected from the top opening of the cultivating barrel, wherein the at least one deflecting plate is sloped with an angle in a range being 10 degrees and 45 degrees, and the at least one spoiler flap being configured to have an intersection angle with respect to the at least one deflecting plate, such that the Karman vortex street effect causes nutrient substances in the nutrient-containing water to be deflected and slowed down to be evenly distributed to each said floor net member; and a light source, comprising:

an omni-directional lighting device, wherein the omni-directional lighting device is inserted into the closed aquafarming space by passing through the install hole, the suspension ring, and the M said center circular support bars, and an electrical connection part of the omni-directional lighting device being stayed over the upper cover; and a control box, being electrically connected to the electrical connection part, and comprising a microprocessor and a memory storing a program, wherein the program includes instructions, such that when the program is executed, the microprocessor is configured for;

driving the omni-directional lighting device to emit an omni-directional grow light illuminating the closed aquafarming space for a period of time, wherein the omni-directional grow light is a multi-wavelength light, and the period of time is in a range between 12 hours and 16 hours.

2. The aquafarming system of claim 1, wherein the at least one deflecting plate is a fixed type or a movable type.

3. The aquafarming system of claim 1, wherein the intersection angle between the at least one deflecting plate and the at least one spoiler flap is configured to be within a range from 15 to 30 degrees.

4. The aquafarming system of claim 1, wherein the intersection angle between the at least one deflecting plate and the at least one spoiler flap is 15 degrees.

5. The aquafarming system of claim 1, wherein each of said floor net members is formed by interweaving a plurality of nylon threads, enforced plastic threads, or stainless steel cords.

6. The aquafarming system of claim 1, wherein there is a protruded flange provided on the upper cover in communication with the install hole, such that the electrical connection part of the omni-directional lighting device is mounted on the upper cover through the protruded flange.

7. The aquafarming system of claim 1, wherein the omni-directional lighting device is a fluorescent lamp or an incandescent lamp.

8. The aquafarming system of claim 1, wherein the cultivating barrel is provided with a water outlet having a valve switch for selective connection of the water outlet to either a recycling tube for recycling drained water or a drainage tube for discarding drained water.

9. The aquafarming system of claim 1, wherein the cultivating barrel and the netted cage are both formed with a cross section in the shape of a circle, a square, a rectangle, a polygon, an ellipse, or a plum flower shape.

10. The aquafarming system of claim 1, wherein a bottom side of the cultivating barrel has a circular shape.

11. The aquafarming system of claim 1, wherein the cultivating barrel is provided with a circular filtering net on a bottom side thereof.

12. The aquafarming system of claim 1, wherein the the omni-directional lighting device is an LED lighting device.

* * * * *